US008783578B2

(12) United States Patent
Kim

(10) Patent No.: US 8,783,578 B2
(45) Date of Patent: Jul. 22, 2014

(54) DYNAMIC DISPLAY INFORMATION CARD

(76) Inventor: Moon J. Kim, Wappingers Falls, NY (US)

( * ) Notice: Subject to any disclaimer, the term of this patent is extended or adjusted under 35 U.S.C. 154(b) by 0 days.

(21) Appl. No.: 13/166,512

(22) Filed: Jun. 22, 2011

(65) Prior Publication Data

US 2012/0325905 A1 Dec. 27, 2012

(51) Int. Cl.
*G06K 19/06* (2006.01)
(52) U.S. Cl.
USPC .......................................................... 235/492
(58) Field of Classification Search
USPC .......................................................... 235/492
See application file for complete search history.

(56) References Cited

U.S. PATENT DOCUMENTS

| | | | | |
|---|---|---|---|---|
| 4,806,745 | A | * | 2/1989 | Oogita ........................... 235/492 |
| 4,868,376 | A | * | 9/1989 | Lessin et al. .................. 235/492 |
| 4,916,296 | A | | 4/1990 | Streck |
| 4,954,985 | A | | 9/1990 | Yamazaki |
| 6,050,494 | A | | 4/2000 | Song et al. |
| 6,089,451 | A | | 7/2000 | Krause |
| 6,325,285 | B1 | | 12/2001 | Barartelli |
| 6,394,343 | B1 | * | 5/2002 | Berg et al. ..................... 235/379 |
| 6,398,115 | B2 | | 6/2002 | Krause |
| 6,641,050 | B2 | | 11/2003 | Kelley et al. |
| 6,662,166 | B2 | | 12/2003 | Pare, Jr. et al. |
| 6,715,679 | B1 | | 4/2004 | Infosino |
| 6,997,381 | B2 | | 2/2006 | Arnouse |
| 7,028,897 | B2 | | 4/2006 | Fernandes et al. |
| 7,051,932 | B2 | | 5/2006 | Fernandes et al. |
| 7,070,112 | B2 | | 7/2006 | Beenau et al. |
| 7,172,115 | B2 | | 2/2007 | Lauden |
| 7,205,473 | B2 | | 4/2007 | Li et al. |
| 7,246,752 | B2 | | 7/2007 | Brown |
| 7,252,232 | B2 | | 8/2007 | Fernandes et al. |
| 7,277,562 | B2 | | 10/2007 | Zyzdryn |
| 7,278,581 | B2 | | 10/2007 | Ong |
| 7,306,158 | B2 | | 12/2007 | Berardi et al. |
| 7,314,164 | B2 | | 1/2008 | Bonalle et al. |
| 7,341,181 | B2 | | 3/2008 | Bonalle et al. |
| 7,438,234 | B2 | | 10/2008 | Bonalle et al. |
| 7,445,149 | B2 | | 11/2008 | Bonalle et al. |
| 7,451,924 | B2 | | 11/2008 | Bonalle et al. |
| 7,451,925 | B2 | | 11/2008 | Bonalle et al. |
| 7,472,833 | B2 | * | 1/2009 | Justin ............................ 235/492 |

(Continued)

OTHER PUBLICATIONS

"Citala's innovative flexible display technology", Printed Electronics World, Dec. 16, 2008, 4 pages. http://www.printedelectronicsworld.com/articles/citalas_innovative_flexible_display_tech . . .

(Continued)

*Primary Examiner* — Jamara Franklin
(74) *Attorney, Agent, or Firm* — Maxine L. Barasch; Keohane & D'Alessandro PLLC

(57) ABSTRACT

In general, embodiments of the present invention provide a card (e.g., identification, debit card, credit card, smart card, etc.) having a dynamic information display panel integrated therein. The display panel is typically activated when user uses the card. This can occur when the card is swiped, and/or is powered up via an integrated energy panel (e.g., by an external light source). Alternatively, the card can be powered by RFID coupling, smart IC contact, battery, etc. Upon powering up, displayed information is used to: identify the user; and/or show private information to user only. Along these lines, displayed information can remain in card memory and/or on the display until next transaction, or it can be deleted after a programmed duration.

20 Claims, 9 Drawing Sheets

(56) References Cited

U.S. PATENT DOCUMENTS

| | | | |
|---|---|---|---|
| 7,500,616 B2 | 3/2009 | Beenau et al. | |
| 7,533,828 B2 | 5/2009 | Ong | |
| 7,543,156 B2 | 6/2009 | Campisi | |
| 7,591,416 B2 | 9/2009 | Blossom | |
| 7,637,434 B2 | 12/2009 | Beenau et al. | |
| 7,677,459 B2 | 3/2010 | Arnouse | |
| 7,690,577 B2 | 4/2010 | Beenau et al. | |
| 7,780,091 B2 | 8/2010 | Beenau et al. | |
| 7,793,851 B2 | 9/2010 | Mullen | |
| 7,814,332 B2 | 10/2010 | Beenau et al. | |
| 7,828,220 B2 | 11/2010 | Mullen | |
| 7,909,247 B2 | 3/2011 | Bonalle et al. | |
| 2006/0037073 A1* | 2/2006 | Juels et al. | 235/492 |
| 2006/0161789 A1 | 7/2006 | Doughty et al. | |
| 2006/0170530 A1 | 8/2006 | Nwosu et al. | |
| 2006/0224504 A1 | 10/2006 | Nwosu et al. | |
| 2007/0033150 A1 | 2/2007 | Nwosu | |
| 2007/0241183 A1 | 10/2007 | Brown et al. | |
| 2008/0040274 A1 | 2/2008 | Uzo | |
| 2008/0120236 A1 | 5/2008 | Faith et al. | |
| 2008/0222047 A1 | 9/2008 | Boalt | |
| 2008/0278325 A1 | 11/2008 | Zimman et al. | |
| 2009/0240625 A1* | 9/2009 | Faith et al. | 705/65 |
| 2009/0248581 A1 | 10/2009 | Brown | |
| 2010/0082444 A1 | 4/2010 | Lin et al. | |
| 2010/0252638 A1* | 10/2010 | Slikkerveer et al. | 235/492 |

OTHER PUBLICATIONS

CROUCH_"Credit Card Magnetic Stripes Get Smarter", Fox Business, Mar. 4, 2011, 3 pages. http://www/foxbusiness.com/personal-finance/2011/03/04/credit card-magnetic-stripes-sm . . .

"Pixels in your pocket", Jon Peddie Research, News Watch, Jul. 3, 2006, vol. 6, No. 14.

McFadden, L., "Programmable Credit Cards", Bankrate.com, Sep. 16, 2010, 3 pages. http://bankrate.com/financing/credit-cards/programmable-credit-cards/.

"IC Card V.S. RFID", EMBA reports (2006). http://joung.im.ntu.edu.tw/teaching/EMBADIS/2006EMBA/reports?IT1_IC-RFID.ppt.

Fazzalaro, J., "The Real ID Act, Enhanced Drivers' Licenses, and Related Applications", OLR Research Report, Nov. 16, 2007, 10 pages. http://www.cga.ct.gov/2007/rpt/2007-R-0659.htm.

Hale, J., "This year's hot new gadget? Programmable credit cards", Savings Accounts.com, Jan. 14, 2011, 5 pages. http://www.savingsaccounts.com/bankingnews/this-years-hot-new-gadget-programmable-c . . .

* cited by examiner

DYNAMIC DISPLAY INFORMATION CARD

CROSS-REFERENCE TO RELATED APPLICATION

The present application is related in some aspects to commonly owned and co-pending application Ser. No. 13/103,682, entitled "AUTOMATED CARD INFORMATION EXCHANGE PURSUANT TO USER AUTHENTICATION," which was filed on May 9, 2011, the entire contents of which are herein incorporated by reference. The present application is related in some aspects to commonly owned and co-pending application Ser. No. 13/159,504, entitled "LIGHT-POWERED SMART CARD FOR ON-LINE TRANSACTION PROCESSING," which was filed on Jun. 14, 2011, the entire contents of which are herein incorporated by reference.

FIELD OF THE INVENTION

In general, the present invention relates to transaction processing. Specifically, the present invention relates to a multi-function card (e.g., credit card, debit card, smart card, etc.) having a dynamic display.

BACKGROUND OF THE INVENTION

Current identification cards typically use static information for online uses. Such static information is generally easy to hack and/or intercept. Additional instruments/hardware for user identification can increase costs and/or may be unrealistic to use due to the volume of potential users/customers and the number of cards processed at any given point of sale.

U.S. Pat. Nos. 7,533,828 and 7,278,581 disclose an electronic credit card device which includes a keypad, display, speaker, infrared (IR) data input/output (I/O), and radio frequency components.

U.S. Pat. No. 7,205,473 discloses a smart card with an integrated flexible photovoltaic cell or a display module.

U.S. Pat. No. 6,641,050 discloses a smart card that incorporates an electronic fuse and random number generator to improve user authentication security functions during financial transactions.

U.S. Pat. No. 6,325,285 discloses a smart card with an integrated fingerprint reader surface.

U.S. Pat. No. 6,050,494 discloses a smart card with an integrated circuit board, a LCD device, a solar cell unit, and an IC which is connected to all electrical components of the smart card.

U.S. Pat. No. 4,954,985 discloses a data storage card with an integrated liquid crystal display and a data storage region.

U.S. Pat. No. 4,916,296 discloses a smart card which utilizes "light modulated by a spatial light modulating device" to transmit stored data.

U.S. Pat. No. 4,758,718 discloses a secure IC card.

U.S. Patent Application 20090248581 discloses a payment card that includes a "display to support card-not-present transactions where no card reader is available to automate the transaction".

U.S. Patent Application 20070241183 discloses a similar "user display for card-not-present transactions" as 20090248581, but the displayed code is a personal identification number (PIN) rather than a unique account number.

U.S. Pat. No. 7,814,332 discloses a biometrics payment device that primarily deals with voiceprint biometric data.

U.S. Pat. Nos. 7,780,091, 7,690,577, and 7,637,434 disclose a method for registering biometric information for use in an RFID transponder-reader system.

U.S. Pat. Nos. 7,677,459 and 6,997,381 disclose a smart card reader with dual card insertion points.

U.S. Pat. No. 7,543,156 discloses a transaction authentication card which uses biometric input and a wireless output.

U.S. Pat. No. 7,500,616 discloses a system and method for biometric security using multiple biometrics in a system.

U.S. Pat. Nos. 7,451,925, 7,451,924, 7,445,149, 7,438,234 and 7,314,164 disclose a system and method for biometric security.

U.S. Pat. No. 7,341,181 discloses a method for biometric security using a smartcard.

U.S. Pat. No. 7,277,562 discloses a biometric imaging capture system and method.

U.S. Pat. No. 7,172,115 discloses a biometric identification system that includes one or more identification devices or cards.

U.S. Pat. No. 6,662,166 discloses a method and device for token-less authorization of an electronic payment.

U.S. Patent Application 20100082444 discloses a portable point-of-purchase user interface that can include near field communication devices, camera, scanner, and a biometric sensor for acquiring the identification or payment information.

U.S. Patent Application 20080278325 discloses a programmable RFID transponder for transmitting unique identifier data stored in the RFID transponder.

U.S. Patent Application 20080040274 discloses a method for making secure electronic payments using communications devices and biometric data.

U.S. Patent Application 20070033150 discloses a biometric web payment system.

U.S. Patent Application 20060224504 discloses a mobile biometric merchant transaction device.

U.S. Patent Application 20060170530 discloses a fingerprint-based authentication method.

SUMMARY OF THE INVENTION

In general, embodiments of the present invention provide a card (e.g., identification, debit card, credit card, smart card, etc.) having a dynamic information display panel integrated therein. The display panel is typically activated and powered up when user uses the card. This can occur when the card is swiped and/or is powered up via an integrated energy panel (e.g., by an external light source). Alternatively, the card can be powered by RFID coupling, smart IC contact, battery, etc. Upon powering up, displayed information is used to: identify the user; and/or show private information to user only. Along these lines, displayed information can remain in card memory and/or on the display until the next transaction, or it can be deleted after a programmed duration. In addition, the teachings recited herein could be used for any type of user authentication and/or authentication such as for access control, a commercial transaction, etc.

A first aspect of the present invention provides a card for dynamically displaying information pursuant to user authentication, comprising: a dynamic display for displaying information; and an integrated circuit (IC) for controlling the dynamic display and for accessing a memory medium on the card, the memory medium storing the information.

A second aspect of the present invention provides a method for automated card information exchange pursuant to user authentication, comprising: activating a card used to complete the user authentication; performing the user authentication by processing information obtained from the card; displaying processed information pursuant to the authorizing on a dynamic display integrated on the card; and determining whether the processed information is valid as displayed on the dynamic display.

A third aspect of the present invention provides a method for automated card information exchange pursuant to user authentication, comprising: activating and powering up a card used to complete the user authentication; performing the user authentication by processing information obtained from the card; displaying a user identification question on a dynamic display integrated on the card; processing an answer to the question; performing an additional authentication based on the answer; and determining whether the additional authentication is valid.

BRIEF DESCRIPTION OF THE DRAWINGS

These and other features of this invention will be more readily understood from the following detailed description of the various aspects of the invention taken in conjunction with the accompanying drawings in which.

Figure 1:
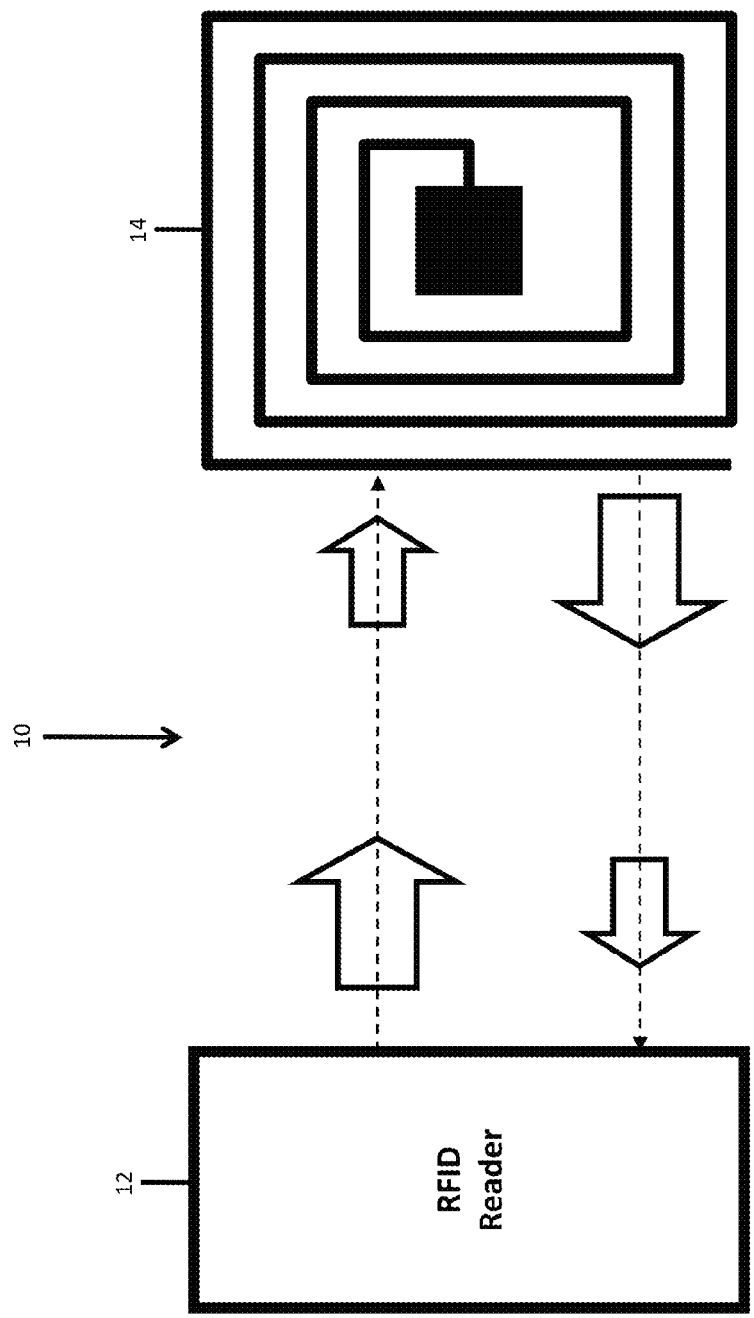
FIG. 1 depicts an RFID configuration according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention provide a card (e.g., identification, debit card, credit card, smart card, etc.) having a dynamic information display panel integrated therein. The display panel is typically activated when user uses the card. This can occur when the card is swiped, and/or is powered up via an integrated energy panel (e.g., by an external light source). Alternatively, the card can be powered by RFID coupling, smart IC contact, battery, etc. Upon powering up, displayed information is used to: identify the user; and/or show private information to user only. Along these lines, displayed information can remain in card memory and/or on the display until next transaction/use, or it can be deleted after a programmed duration. It is understood that the card can be an identification card or a card such as a debit card or credit card used pursuant to a commercial transaction.

It is understood that the term "card" as used herein is intended to mean any type of card now known or later developed that can be used pursuant to user authentication. Along these lines, radio-frequency identification (RFID) technology could be implemented (e.g., in a smart card embodiment). As such, this disclosure includes a description of RFID. In addition, the teachings recited herein could be used for any type of user authentication and/or authentication such as for access control, a commercial transaction, etc.

In general, RFID is a technology that incorporates the use of electromagnetic or electrostatic coupling in the radio frequency (RF) portion of the electromagnetic spectrum to uniquely identify an object, animal, or person. RFID is coming into increasing use in the industry as an alternative to the bar code. The advantage of RFID is that it does not require direct contact or line-of-sight scanning. An RFID system consists of three components: an antenna and transceiver (often combined into one reader) and a transponder (the tag). The antenna uses radio frequency waves to transmit a signal that activates the transponder. When activated, the tag transmits data back to the antenna. The data is used to notify a programmable logic controller that an action should occur. The action could be as simple as raising an access gate or as complicated as interfacing with a database to carry out a monetary transaction. Low-frequency RFID systems (e.g., 30 KHz to 500 KHz) have short transmission ranges (generally less than six feet). High-frequency RFID systems (850 MHz to 950 MHz and 2.4 GHz to 2.5 GHz) offer longer transmission ranges (more than 90 feet). RFID is sometimes called dedicated short range communication (DSRC).

RFID tags and labels (collectively referred to herein as "devices" or transponders) are widely used to associate an object with an identification code or other information. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels. As noted above, RFID devices are generally categorized as labels or tags. RFID labels are RFID devices that are adhesive or otherwise have a surface attached directly to objects. RFID tags, in contrast, are secured to objects by other means (for example, by use of a plastic fastener, string, or other fastening means).

RFID devices include: (1) active tags and labels, which include a power source for broadcasting signals; and (2) passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and communicate enough information to uniquely identify individuals, packages, inventory, and the like. RFID tags and labels also can be characterized as those to which information is written only once (although the information may be read repeatedly), and those to which information may be written to repeatedly during use. For example, RFID tags may store environmental data (that may be detected by an associated sensor), logistical histories, state data, etc.

Along these lines, RFID devices can be further characterized as passive, semi-passive, and active RFID devices. Passive RFID devices have no internal power supply. Power for operation of passive RFID devices is provided by the energy in an incoming radio frequency signal received by the device. Most passive RFID devices signal by backscattering the carrier wave from an RF reader. Passive RFID devices have the advantage of simplicity and long life, although performance of them may be limited. In general, the teachings recited herein pertain to passive RFID technology Referring now to FIG. 1, an illustrative RFID configuration according to the present invention is shown. As depicted, configuration 10 shows an RFID transceiver/reader 12 communicating with RFID transponder 14. Transponder 14 can be any type of RFID transponder now known or later developed. Examples include the aforementioned labels and/or tags. As further shown, RFID reader 12 and RFID transponder 14 will exchange data (e.g., security information, etc.). Under the present invention, these types of components will be leveraged to create a strong passive ad-hoc RFID network that is (among other things) capable of communicating over longer distances and around physical objects.

Figure 2:
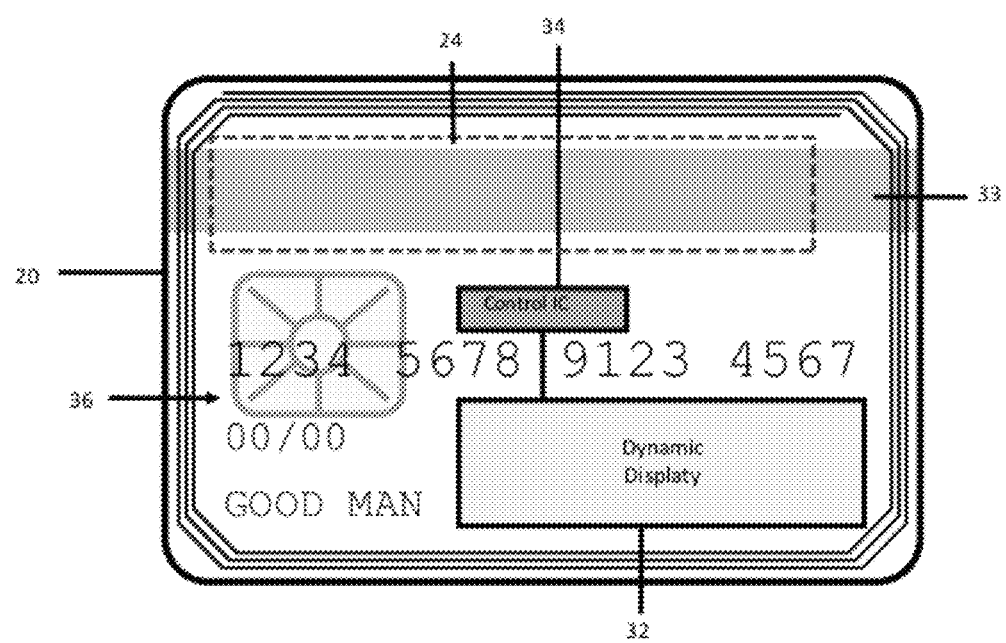
FIG. 2 depicts a front and back of a multi-function card according to an embodiment of the present invention.

Referring now to FIG. 2, a card (e.g., a credit card, a debit card and/or a smart card) 20 according to an embodiment of the present invention is shown. Card 20 can be equipped to communicate in an RFID manner using any of the aforementioned description. In any event, card 20 includes a front side and a back or magnetic stripe side. As depicted in FIG. 2, card 20 includes card information 36, and a dynamic display 32. As further shown, the back side of card 20 can optionally include an energy component 24 (e.g., a solar panel cell and/or a photon-to-electric energy converter) for providing power to card 20, and magnetic strip 33. As further shown, embedded within the card, is integrated circuit/controller 34 and corresponding logic. The functions and interrelationships between the components of FIG. 2 will be described in conjunction with FIG. 3.

Figure 3:
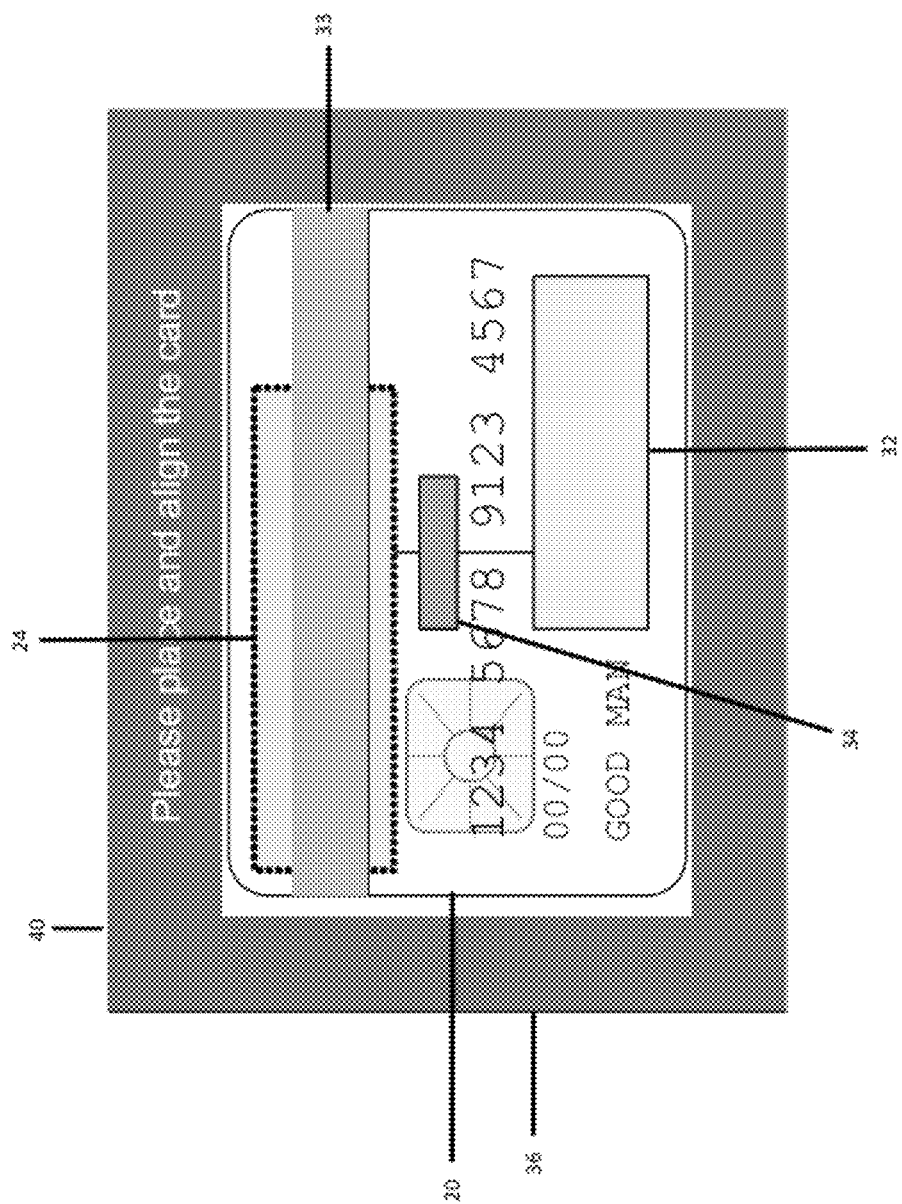
FIG. 3 depicts the card of FIG. 2 as used pursuant to user authentication according to an embodiment of the present invention.
Figure 6:
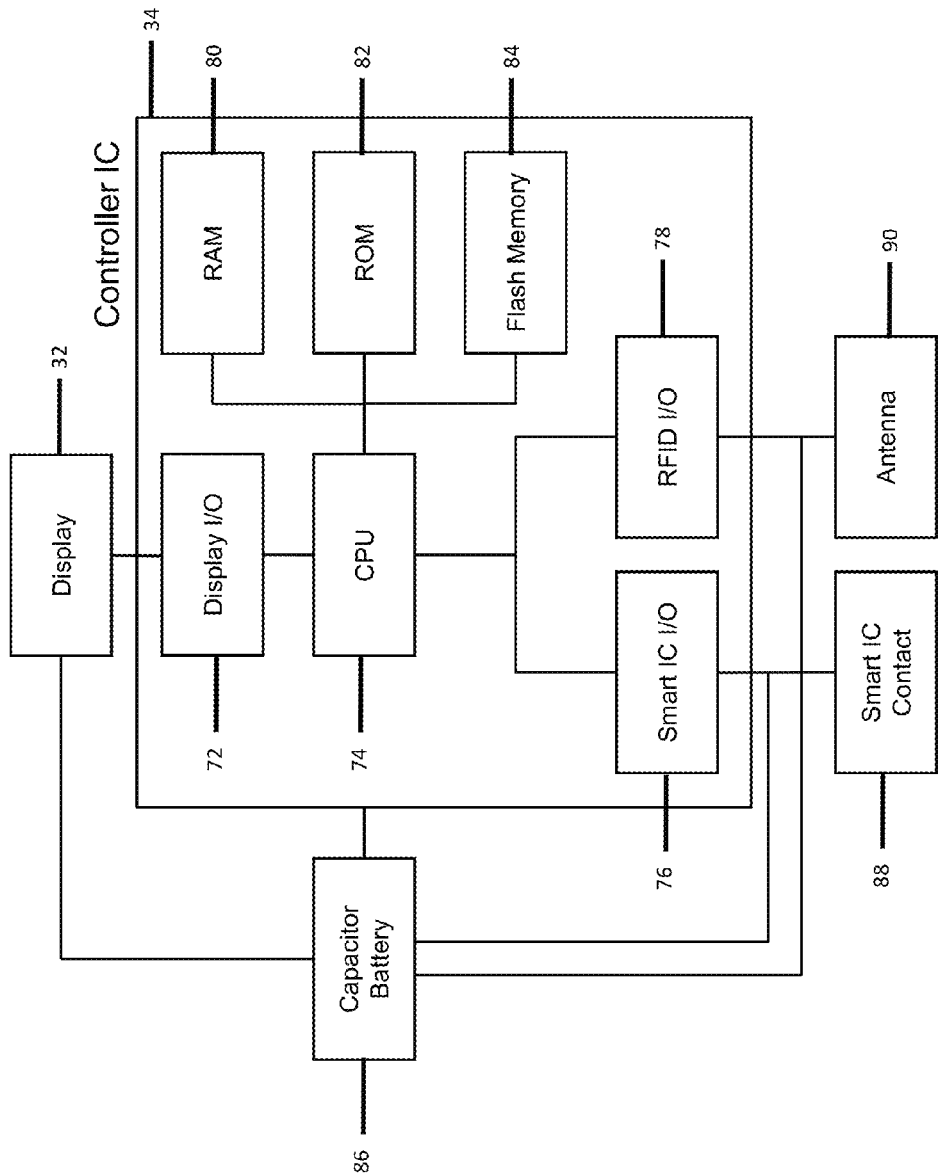
FIG. 6 depicts a block diagram of an integrated circuit (IC) according to an embodiment of the present invention.

As shown in FIG. 3, when user authentication is being conducted, card 20 will be swiped and/or placed in proximity and/or alignment with a point of sale terminal 40, RFID reader or the like (or a display associated therewith), and powered-up/activated via energy component 24 and/or an internal battery (such as that shown in FIG. 6). The terminal displays alignment information for the card. The alignment places an energy conversion component to face a display area that is intentionally transparent to backlight maximally, which results in white background color on the terminal display usually, so that the light energy conversion component gets maximum energy. Terminal screen brightness might be controlled for higher brightness by the interface application or web browser to increase light energy available to the card. Card information 36 (e.g., the card number, expiration, user name, security code, etc.) is shared by the card company and/or the card is accessed. Either terminal 40 or a server associated therewith will then attempt to validate the user based upon this information. It is understood in the event the user authentication is being performed pursuant to a commercial transaction, such authentication can include any traditional method and/or include any of the approaches discussed in the above-incorporated patent applications. Examples include the generation of a SVS, CVC, and/or UVC (biometric-based). In either any, a corresponding validation result (e.g., information, a user question, user information, etc.) can be displayed on front display 32 of card 20.

Figure 4:
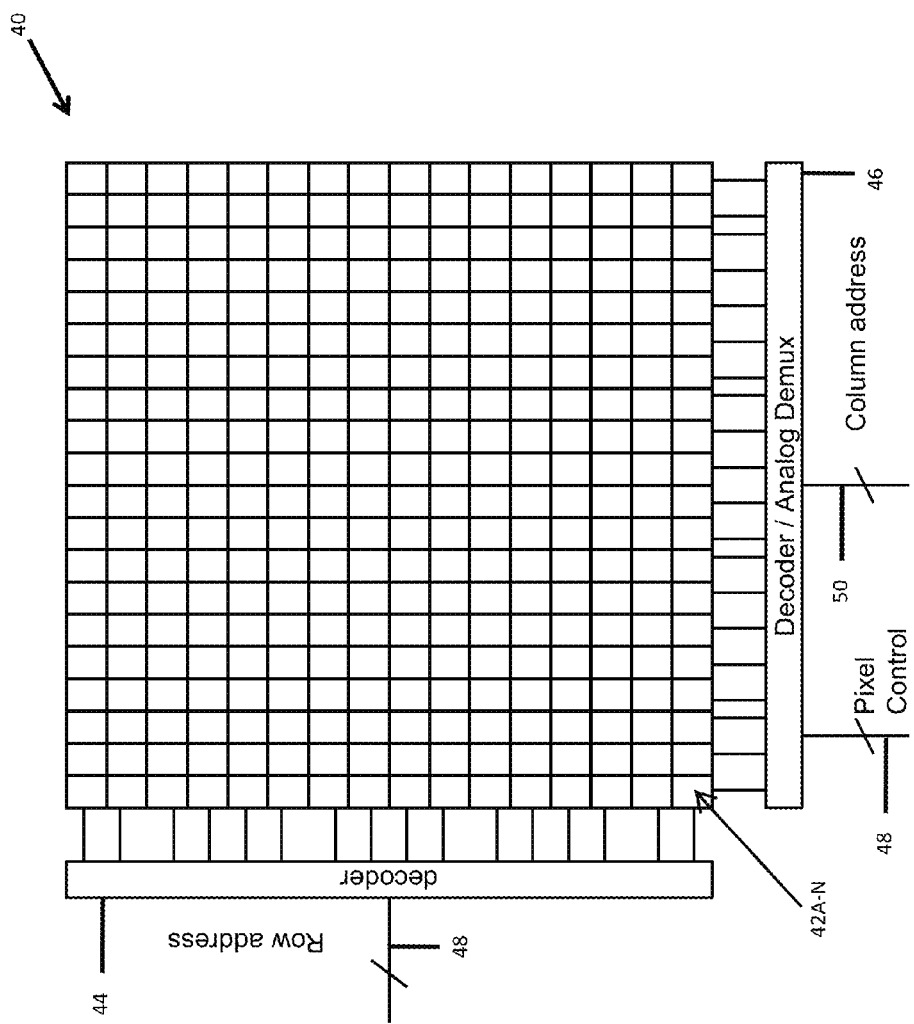
FIG. 4 depicts an electrode array formation diagram according to an embodiment of the present invention.

FIG. 4 depicts an electrode/pixel array formation diagram according to an embodiment of the present invention. Electrode/pixel array 40 generally comprises a column-row array/matrix of electrodes/pixels 42A-N. Coupled to array 40 is a decoder 48 and a decoder/analog de-multiplexer 46. Decoder 44 is coupled to row address 48, while decoder 46 is coupled to pixel control 48 and column address 50. Decoders 46 and 48 allow direct addressing of rows and columns. In electrode/pixel array 40, the electrodes/pixels enablement is determined by row address 48 and column address 50. As an initialization, the inputs for electrode potential equalization are set to 'enable all' (48, 50).

Figure 5:
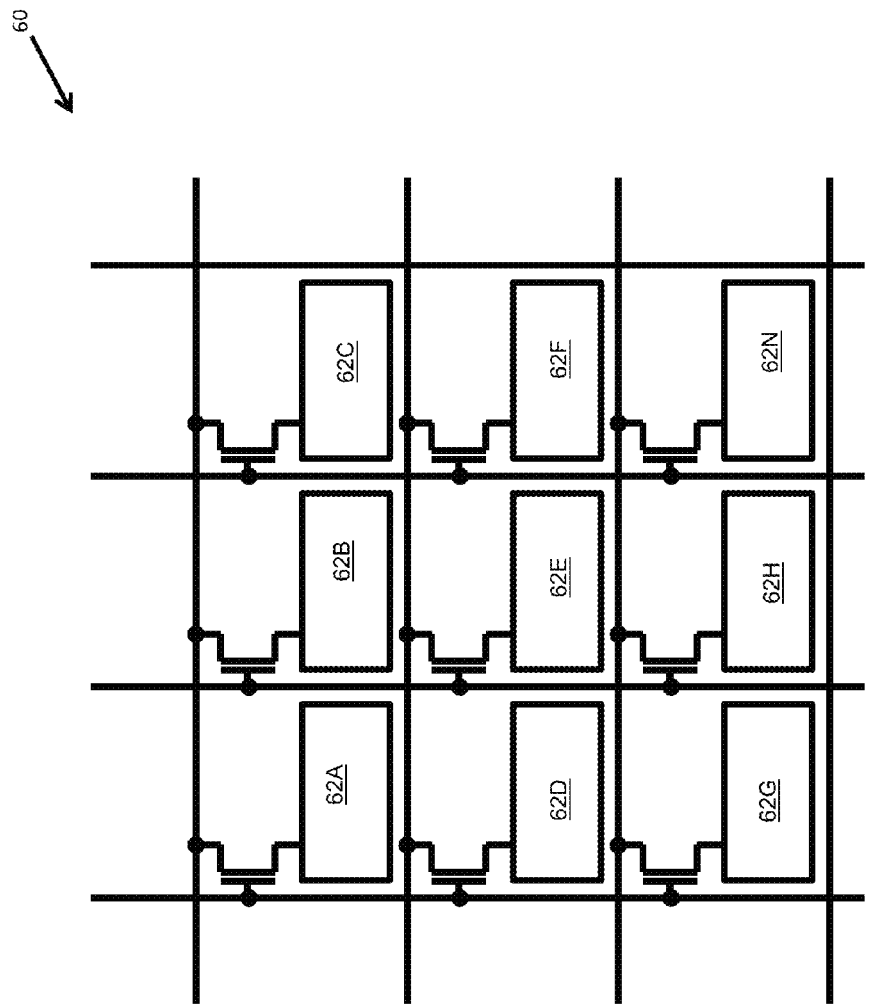
FIG. 5 depicts a diagram of a two-way electrical sensing array according to an embodiment of the present invention.

Referring now to FIG. 5, an electrical sensing/display pixel array 60 according to an embodiment of the present invention is shown. As shown, array 60 comprises nodes 62A-N. In general, each electric sensing node can be accessed by two independent electrical accesses. As such, two nodes can be accessed independently for electrical sensing.

Referring now to FIG. 6, the interrelationship between display 32 and IC 34 is shown in greater detail. As depicted, IC 34 comprises a central processing unit (CPU) 74, a display input/output (I/O) 72 coupled to CPU 74 and display 32, a smart IC I/O 76 coupled to CPU 74, a RFID I/O 78 coupled to CPU, and a set of memory medium (random access memory (RAM) 80, read only memory (ROM) 82, and flash memory 84 coupled to CPU 74. Coupled to IC 34 and display 32 is capacitor battery 86 for providing power to the card. Also, coupled to smart IC I/O 76 is smart IC contact 88 and coupled to RFID I/O 78 is (RFID) antenna 90.

Figure 7:
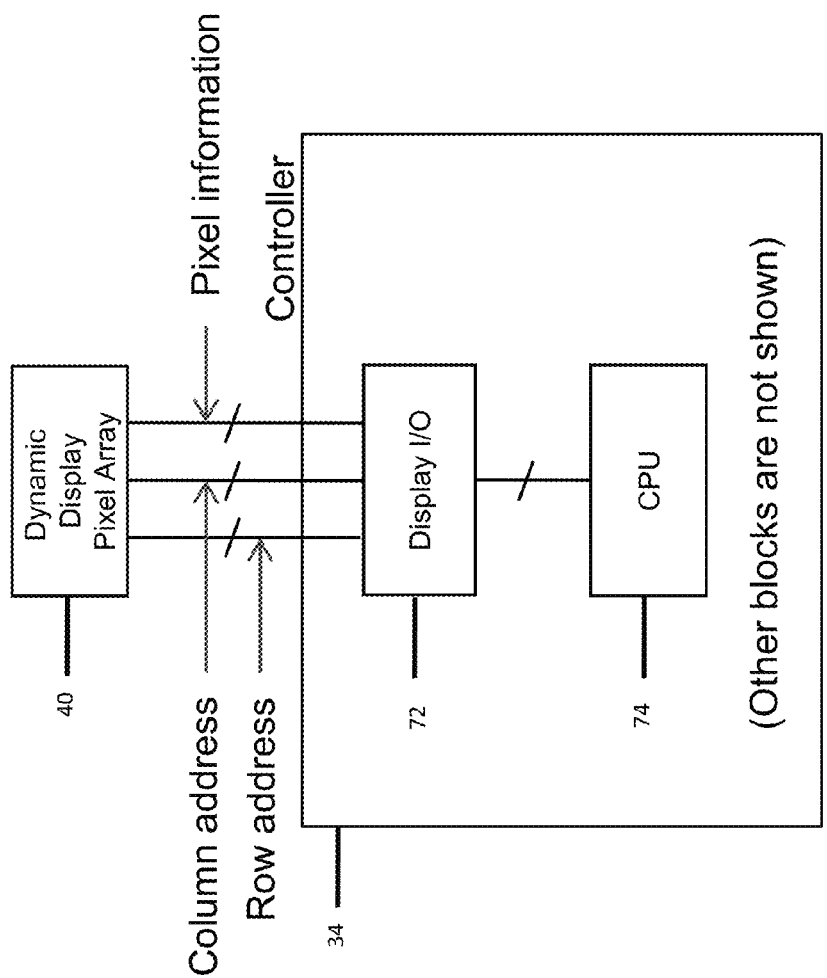
FIG. 7 depicts a block diagram of a display controller according to an embodiment of the present invention.

Referring now to FIG. 7, a display control diagram is shown. As depicted, pixel array 40 of display 32 is coupled to IC/controller 34 (which shows display I/O 72 and CPU 74 of FIG. 6) via row address 48, column address 50 and pixel information 52.

Figure 8:
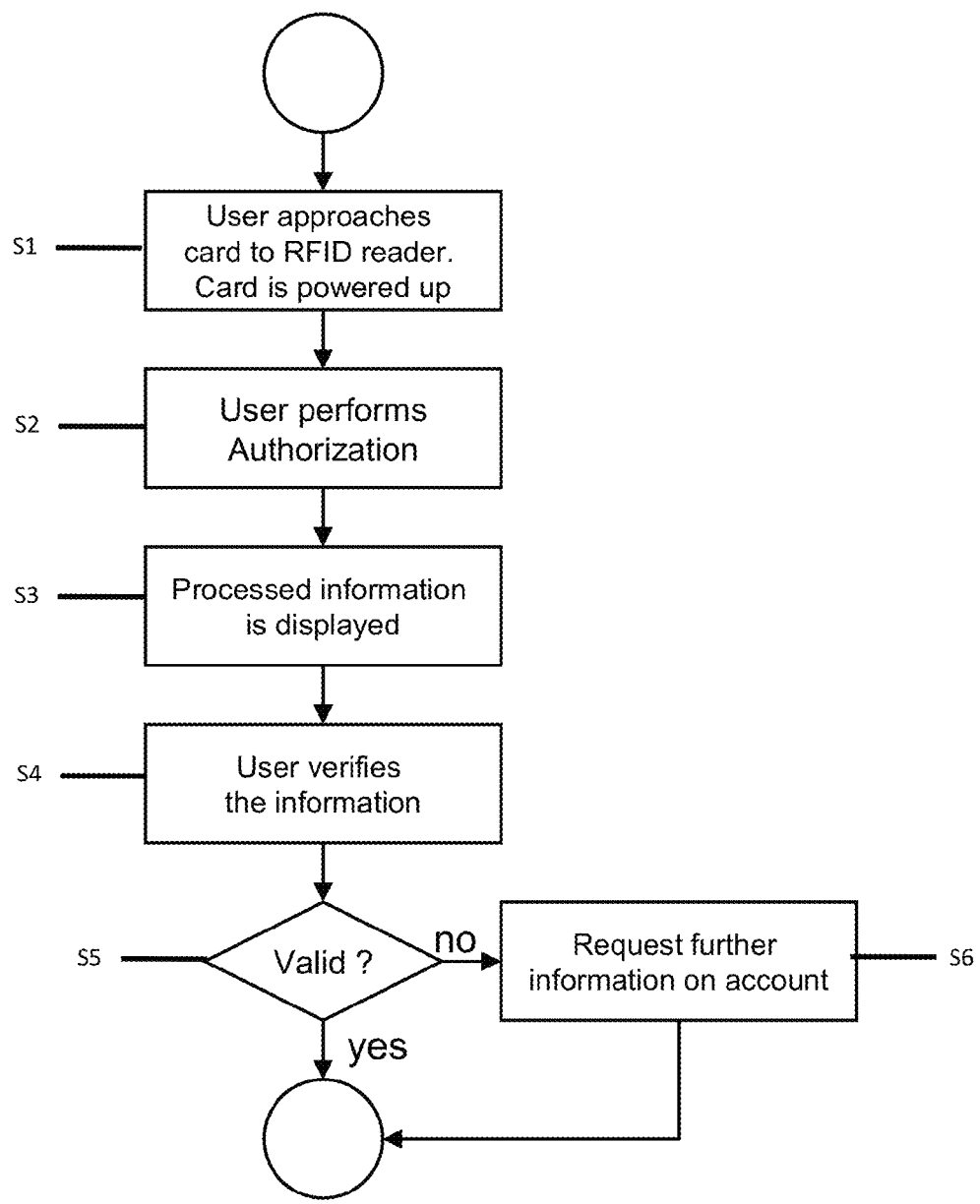
FIG. 8 depicts a method flow diagram according to the embodiment of the present invention.

Referring now to FIG. 8, a method flow diagram according to an embodiment of the present invention is shown. In step S1, the user approaches the card to an RFID reader and the card is powered up to activate a card used. In step S2, the user authentication is performed by processing information obtained from the card. User authentication might be done through RFID communication, smart card IC communication, or additional communication methods between the card and host terminal. Additional method might include invisible electro-magnetic wave, visible wave, or mechanical movement integrated in the card to facilitate authentication process. In step S3, processed information obtained pursuant to the authorizing is displayed on a dynamic display integrated on the card. Processed information might include, but not limited to authentication result, balance in the account, last access history, credit card limit. In step S4, it is determined (e.g., by the user) whether the processed information is valid as displayed on the dynamic display. If not, additional information can be requested in step S6.

Figure 9:
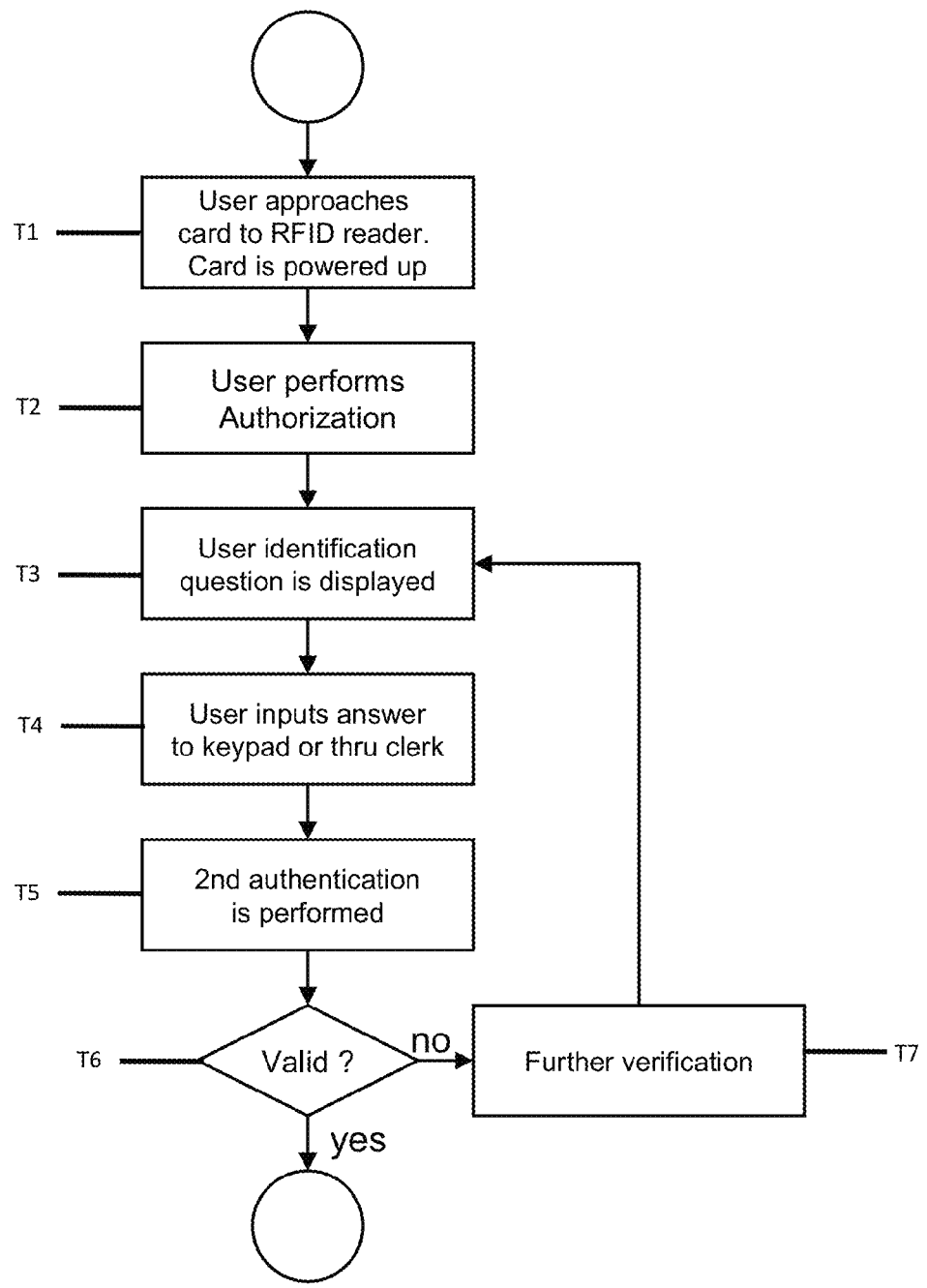
FIG. 9 depicts another method flow diagram according to the embodiment of the present invention.

Referring now to FIG. 9, another method flow diagram according to an embodiment of the present invention is shown. In step T1, the user approaches the card to an RFID reader and the card is powered up to activate a card used. In step T2, the user authentication is performed by processing information obtained from the card. In step T3, a user identification question is displayed on a dynamic display integrated on the card. In step T4, an answer to the question is obtained (e.g., based upon user input on a keypad or the like). The authentication process might include information shown in the card display, and requires user interaction through host terminal, live agent, or card itself, when there are additional means to accept user intention and information. In step T5, an authentication is performed based on the answer. In step T6, it is determined whether the authentication is valid. If not, additional information can be requested in step T7.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A card for dynamically displaying information pursuant to user authentication, comprising:
   a dynamic display for displaying information;
   an integrated circuit (IC) for controlling the dynamic display and for accessing a memory medium on the card, the memory medium storing the information; and
   an energy component, wherein the card is powered by alignment of the energy component with a light source of a point of sale terminal;
   a biometric reader; and
   an imager;
   wherein the user authentication is performed by:
      receiving a source verification code (SVC) via the imager, the SVC being generated based on the card information;
      generating a card validation code (CVC) on the card using the SVC;
      generating a user validation code (UVC) pertaining to a validation of a user, the UVC code being generated based on a biometric reading taken via the biometric reader;
      communicating the SVC, the CVC, and the UVC to a transaction validator via a website;
      generating a validation result for the commercial transaction based on the SVC, the CVC, and the UVC; and
      displaying the validation result on the dynamic display.

2. The card of claim 1, the dynamic display comprising a column-row array of pixels.

3. The card of claim 2, the dynamic display further comprising at least one decoder coupled to the column-row matrix of pixels.

4. The card of claim 3, the at least one decoder comprising an analog de-multiplexer.

5. The card of claim 2, the column-row array of pixels comprising a set of transistors.

6. The card of claim 1, the IC comprising:
   a central processing unit (CPU);
   a display input/output (I/O) coupled to the CPU;
   a smart IC I/O coupled to the CPU; and
   an RFID I/O coupled to the CPU.

7. The card of claim 6, the memory medium being integrated within the IC.

8. The card of claim 7, the memory medium comprising at least one of the following: random access memory (RAM), read only memory (ROM), or flash memory.

9. The card of claim 6, further comprising:
   a smart IC contact coupled to the smart IC I/O; and
   an antenna coupled to the RFID I/O.

10. The card of claim 1, the card and the dynamic display further being powered by at least one of the following: an external power source, a capacitor battery, radio frequency coupling, a radio frequency coupling through RFID, or a smart IC contact.

11. A method for automated card information exchange pursuant to user authentication, comprising:
    activating and powering up a card used to complete the user authentication;
    performing the user authentication by processing information obtained from at least one of the card and a user interaction through a host terminal or a live agent, the user authentication comprising:
       receiving a source verification code (SVC) via an imager positioned on the card, the SVC being generated based on the information;
       generating a card validation code (CVC) on the card using the SVC;
       generating a user validation code (UVC) pertaining to a validation of a user, the UVC code being generated based on a biometric reading taken via a biometric reader positioned on the card;
       communicating the SVC, the CVC, and the UVC to a transaction validator via a website;
       generating a validation result for the commercial transaction based on the SVC, the CVC, and the UVC;
    displaying the validation result and the processed information pursuant to the authorizing on a dynamic display integrated on the card.

12. The method of claim 11, further comprising requesting additional information pursuant to the processed information not being valid.

13. The method of claim 11, the card comprising:
    a dynamic display for displaying information; and
    an integrated circuit (IC) for controlling the dynamic display and for accessing a memory medium on the card, the memory medium storing the information.

14. The method of claim 11, the dynamic display comprising a column-row array of pixels.

15. The method of claim 14, the dynamic display further comprising at least one decoder coupled to the column-row matrix of pixels.

16. The method of claim 15, the at least one decoder comprising an analog de-multiplexer.

17. The method of claim 14, the column-row array of pixels comprising a set of transistors.

18. The method of claim 13, the IC comprising:
    a central processing unit (CPU);
    a display input/output (I/O) coupled to the CPU;
    a smart IC I/O coupled to the CPU; and
    an RFID I/O coupled to the CPU.

19. A method for automated card information exchange pursuant to user authentication, comprising:
    powering a card by aligning an energy component of the card with a light source of a host terminal;
    activating the card used to complete the user authentication;
    performing the user authentication by processing information obtained from the card and a user interaction through at least one of the host terminal or a live agent, the user authentication comprising:

receiving a source verification code (SVC) via an imager positioned on the card, the SVC being generated based on the information;

generating a card validation code (CVC) on the card using the SVC;

generating a user validation code (UVC) pertaining to a validation of a user, the UVC code being generated based on a biometric reading taken via a biometric reader positioned on the card;

communicating the SVC, the CVC, and the UVC to a transaction validator via a website;

generating a validation result for the commercial transaction based on the SVC, the CVC, and the UVC;

displaying the validation result on a dynamic display integrated on the card.

20. The method of claim 19, further comprising requesting additional information pursuant to the additional authentication not being valid.

* * * * *